United States Patent [19]
Harres

[11] Patent Number: 6,128,112
[45] Date of Patent: *Oct. 3, 2000

[54] WEIGHTED-SUM PROCESSING METHOD AND APPARATUS FOR DECODING DIGITAL SIGNALS

[75] Inventor: Daniel Nelson Harres, Belleville, Ill.

[73] Assignee: McDonnell Douglas Corporation, St. Louis, Mo.

[ * ] Notice: This patent is subject to a terminal disclaimer.

[21] Appl. No.: 08/962,252

[22] Filed: Oct. 31, 1997

Related U.S. Application Data

[63] Continuation-in-part of application No. 08/702,764, Aug. 22, 1996, Pat. No. 5,694,231.

[51] Int. Cl.$^7$ ................................................. H04B 10/08
[52] U.S. Cl. ..................... 359/110; 359/161; 359/189; 375/333; 341/70; 371/6
[58] Field of Search ................................. 359/110, 161, 359/189; 375/324, 330, 333; 341/70; 371/6

[56] References Cited

U.S. PATENT DOCUMENTS

| | | | |
|---|---|---|---|
| 3,349,371 | 10/1967 | Brothman et al. | 371/6 |
| 4,257,125 | 3/1981 | Theall, Jr. | 359/194 |
| 4,302,845 | 11/1981 | McClaughry et al. | 375/328 |
| 4,581,750 | 4/1986 | Dieleman | 375/333 |
| 4,606,052 | 8/1986 | Hirzel et al. | 375/333 |
| 5,081,644 | 1/1992 | Uchida et al. | 375/1 |
| 5,170,396 | 12/1992 | Rivers et al. | 371/6 |
| 5,175,507 | 12/1992 | Roither | 329/304 |
| 5,694,231 | 12/1997 | Harres | 359/110 |

FOREIGN PATENT DOCUMENTS

| | | |
|---|---|---|
| 0 551 695 | 7/1993 | European Pat. Off. . |
| 0551695A1 | 7/1993 | Japan . |

OTHER PUBLICATIONS

Dan Harres, Nonlinear Processing Of Manchester Data Corrupted By Multiplicative Noise, *IEEE International Conference On Communications*, Conference Record, Jun. 7–11 1998, pp. 683–687, vol. 2, New York, USA.

N.A. Olssen, Lightwave Systems With Optical Amplifiers, *Journal Of Lightwave Technology*, vol. 7, No. 7, Jul. 1989, pp. 1071–82.

Fisher; Carpinella: "The Effects of Automatic Gain Control for Optical Signal Detection" IEEE 1983 National Aerospace and Electronics Conference, May 17–19, 1983 New York.

Markarian et al.; "Integrated Circuit Design and Implementation for a New Optimum Manchester Decoder"; IEEE Global Telecommunications Conference, Nov. 14–16, 1995, New York.

International Search Report; PCT/US 97/13575; Dec. 1, 1997.

*Primary Examiner*—Kinfe-Michael Negash

[57] ABSTRACT

The method and associated apparatus of the present invention decodes digital signals by appropriately weighting the respective noise portions of the two phase segments generated by the detector, such as an APD in an optical communications system, such that the digital signal can be reliably decoded despite the presence of multiplicative noise induced by the detector. The detector detects a digitally encoded communications carrier signal having a waveform defining first and second portions. The detector then generates an electrical signal in response to the digitally encoded communications carrier signal. The electrical signal has two phase segments, namely, one phase segment corresponding to the first portion of the digitally encoded communications carrier signal and another phase segment corresponding to the second portion of the digitally encoded communications carrier signal. Each phase segment also includes a respective noise portion. The optical decoding method and apparatus determines a weighting factor based upon the respective noise portions of the two phase segments. Thereafter, at least one phase segment is weighted by the weighting factor. For example, the noisier phase segment can be attenuated by the weighting factor. A decoder can then identify the logic level of the digital signal based upon the two phase segments as weighted by the weighting factor.

21 Claims, 2 Drawing Sheets

WEIGHTED-SUM PROCESSING METHOD AND APPARATUS FOR DECODING DIGITAL SIGNALS

RELATED APPLICATIONS

The present invention is a continuation-in-part of U.S. patent application Ser. No. 08/702,764 filed on Aug. 22, 1996, now U.S. Pat. No. 5,694,231 the contents of which are incorporated in their entirety herein.

FIELD OF THE INVENTION

The present invention relates to the detection and decoding of digital signals and, more particularly, to the detection and decoding of digitally encoded communications carrier signals with a detector which introduces multiplicative noise.

BACKGROUND OF THE INVENTION

High speed data transmission and communications are conventionally accomplished by transmitting communications carrier signals, such as optical or radio frequency ("RF") signals, from an optical or RF transmitter or one or more intermediate relay stations to a signal detector, such as an optical or RF detector, at the front end of a communications receiver. The communications carrier signals are typically formatted according to a predetermined communications standard which assigns the signal characteristics which define a logic "0" and a logic "1". One well known standard is the "Manchester" coding technique which assigns a logic "1" to a negative going signal transition and a logic "0" to a positive going signal transition.

Regardless of the signal carrier frequency employed or the communications standard used, the communications signals must be properly detected and decoded. Receivers in conventional high performance optical communications systems, for example, utilize optical detectors, such as avalanche photo diodes and other avalanche photo detectors (hereinafter collectively referred to as "APDs"), to detect low-level optical signals. In operation, an APD serves as a trigger or switch which generates an electrical output signal when exposed to an optical input. An APD converts the optical signal to a corresponding electrical signal and is thus well-suited to serve as the front end of an optical communications receiver.

APDs, other optical detectors and other signal detectors may produce signal-dependent multiplicative noise. When such a signal detector detects an optical, RF or other input signal, the electrical signal produced at the output of the detector includes multiplicative noise which is a function of input signal level. For APD detectors in optical communications systems, for example, such multiplicative noise includes shot noise which increases as the gain of the APD is increased. Thus, the shot noise generated by an APD which provides a relatively high gain may become a significant part of the resulting electrical signal. See, for example, S. M. Sze, *Semiconductor Devices Physics and Technology*, p. 286 (1985).

Signal-dependent multiplicative noise, such as shot noise in an optical communications system utilizing APDs for optical detection, may thus limit the communications data rate in the communications system by limiting transmitter power level and/or available receiver gain. More generally, the signal-dependent multiplicative noise results in a signal-to-noise reduction which may either reduce the data rate or increase the bit error rate (BER), since these two parameters may be traded off one for another.

In order to properly decode a Manchester encoded signal, i.e., to properly identify the data bit as a logic "1" or a logic "0", it is important to identify which phase segment of the resulting electrical signal has the positive-going transition and which phase segment has the negative-going transition. As the relative noise in the electrical signal increases, however, it becomes increasingly difficult to correctly identify the respective transitions in the phase segments and, as a result, increasingly difficult to decode the associated data bits.

Conventionally, communications systems have treated such multiplicative noise as if it were additive, averaging the noise level over the bit interval. As such, the overall sensitivity of such conventional communications systems has typically been degraded since the multiplicative noise that primarily occurs during only one of the phase segments is assigned an equal, albeit average, wieght during both phase segments, thereby corrupting both phase segments of the bit interval.

In order to detect relatively low level carrier input signals and enable high data rate communications, an APD or other signal detector must generally provide a relatively high gain, such as a gain of 200. However, conventional communication systems cannot increase detector gain without limit since the resulting electrical signals provided by the APD or other signal detector will include proportionally more noise. The multiplicative noise generated by an APD thus effectively limits the gain which can be provided by the detector without excessively increasing the BER.

A wide variety of signal detection techniques have been proposed. For example, U.S. Pat. No. 3,349,371 which issued to Brothman et al. and is entitled *Quaternary Decision Logic* proposes to distinguish between a binary "1" and a binary "0" by classifying the signal in one of four categories. This technique proposes to adjust system parameters, such as to increase or decrease the total transmitted energy, based on ambiguous signal recognition. However, Brothman et al. is relatively complex and can be computationally intensive since it measures noise over a long period of time. In addition, Brothman et al. does not address the resolution problems associated with the signal shot noise of an APD.

In addition, U.S. Pat. No. 5,175,507 which issued to Roither and is entitled *Method Of and Device For Demodulating Biphase Modulated Signal* describes a demodulation method which employs a reference phase angle level to determine and assign a binary value to a detected signal. However, Roither does not measure noise and also does not address resolution problems associated with increased noise levels.

OBJECTS OF THE INVENTION

It is thereafter an object of the present invention to provide a more reliable method and apparatus for detecting and decoding digital signals.

It is a further object of the invention to provide a method and apparatus for reliably detecting low level signals by increasing the gain of the detector without unduly increasing the bit error rate.

These and other objects are provided, according to the present invention, by a method and associated apparatus for decoding a digital signal which appropriately weights the respective noise portions of the two phase segments generated by the detector, such as an RF, optical, infrared or magnetic detector, such that the digital signal can be reliably decoded. In operation, the detector detects a carrier signal, such as an optical, RF, infrared or magnetic signal, having a waveform defining first and second portions. For example, optical signals typically have light and dark portions, while RF signals generally have portions with different magnitudes, such as high and low portions. The detector then generates an electrical signal in response to the carrier signal. The electrical signal has two phase segments, namely, one segment corresponding to the first portion of the carrier signal and another phase segment corresponding to the second portion of the carrier signal. Each phase segment includes respective signal and noise portions. According to the present invention, a signal weighting factor is determined, such as by a signal weighting factor determining means, based upon the respective noise portions of the two phase segments. Thereafter, at least one phase segment is weighted by the signal weighting factor. A decoder can then identify the digital signal based upon the first and second phase segments as weighted by the signal weighting factor.

The signal weighting factor determining means preferably includes power determining means for determining the power of the respective noise portions of the two phase segments. Based upon the power of the respective noise portions, the signal weighting factor can be determined such that the multiplicative product of the signal weighting factor and the power of the noise portion of one phase segment equals the power of the noise portion of the other phase segment. Alternatively, the signal weighting factor can be determined by the ratio of the power of the noise portion of one phase segment to the power of the noise portion of the other phase noise segment. Typically, the weighting factor is between 0 and 1 such that the phase segment which has the noise portion with the greatest power is attenuated by the signal weighting factor.

Once properly weighted, the decoder can properly identify the digital signal by summing the two phase segments, such as with a summer, to produce a weighted sum having a respective polarity. The digital signal can then be identified based upon the polarity of the weighted sum. By weighting at least one of the phase segments based upon the power of the noise portions of the respective phase segments, the decoding method and apparatus of the present invention can reliably detect and decode digital signals. In particular, the decoding method and apparatus of the present invention can reliably decode digital signals even as the gain provided by the signal detector, such as the gain provided by an RF detector or optical APD, is increased, thereby allowing signals having lower power levels to be reliably detected and decoded.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Generally described, an encoded digital signal is synchronized and transmitted in bit format along a transmission path, such as via an RF or optical carrier. According to many conventional bit formats, such as the Manchester format, each bit includes first and second portions. For example, optical signals typically have light and dark portions, while RF signals generally have portions with different magnitudes, such as high and low portions.

For purposes of discussion, the digital communications decoding system of the present invention will be described in conjunction with an optical communications system. However, the decoding method and apparatus can be employed in conjunction with other communications systems utilizing other signal formats, such as RF, magnetic, infrared or other carrier signals, without departing from the spirit and scope of the present invention.

A digital receiver 10 generally includes a detector 50, such as an optical photodetector. However, the detector can be an RF detector, a magnetic detector, an infrared detector or other detector employed to detect carrier signal energy on which a digital or other signal is modulated without departing from the spirit and scope of the present invention. One advantageous type of photodetector, particularly for detecting low level optical signals, is an APD. However, the photodetector can be of other types, such as an optical amplifier, PIN photodiode, photomultiplier tube or the like, without departing from the spirit and scope of the present invention.

Figure 1:
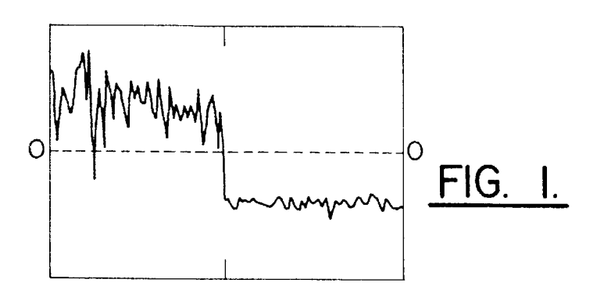
FIG. 1 illustrates an optically-transmitted Manchester encoded bit which has been detected by a conventional avalanche photodiode which was illuminated during the first half of the bit interval.

In a typical optical communications system, the light of an optical signal will be modulated by a digital time-varying signal to illuminate the detector 50 and the photodetector will thereafter generate an electrical signal corresponding to the digital signal modulation. For example, the electrical signal or pulse generated by an APD in response to an optically transmitted Manchester encoded logic "1", is shown in FIG. 1. In the example, the APD is illuminated during the first phase segment, but not during the second segment. The first phase segment proportionately includes significantly more noise, including signal shot noise, than the second phase segment because such noise is multiplicative and not additive.

For purposes of discussion, the decoding method and apparatus 10 of the present invention will be described in conjunction with Manchester encoded signals. However, the decoding method and apparatus can be employed in conjunction with other signal formats, such as signal formats which have both an illuminated portion and a dark portion and signal formats which have a known duty cycle including, but not limited to, Quaternary Phase Shift Keying (QPSK) or Quadrature Amplitude Modulation, without departing from the spirit and scope of the present invention.

Figure 2:
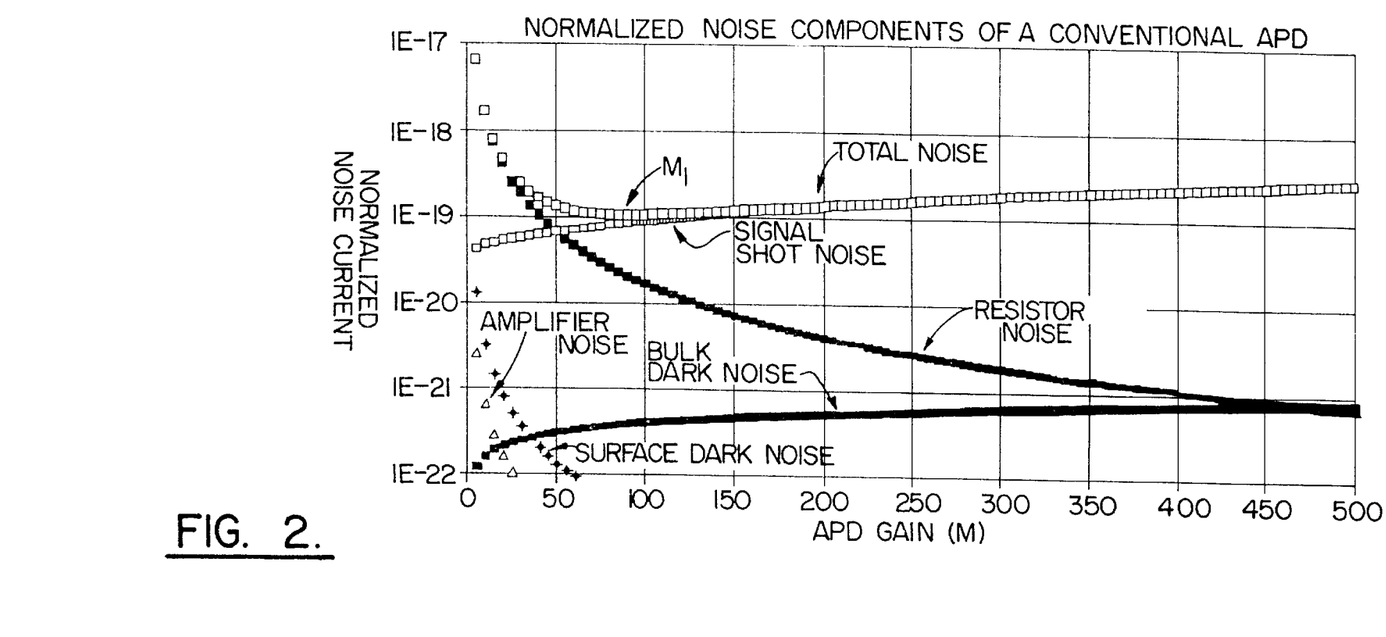
FIG. 2 is a graphical illustration of the various normalized noise components of a conventional avalanche photodiode as a function of avalanche gain M.

The electrical signal generated by an APD in response to a detected optical signal includes a variety of noise components. As shown in FIG. 2, for example, the noise portion of the electrical signal includes signal shot noise (at least during the portion of the electrical signal corresponding to a light portion) and low level noise components, such as resistor noise, bulk dark noise, surface dark noise and amplifier noise. While each noise component varies differently as a function of the gain of the APD, the total noise current, as normalized by the gain of the amplifier, initially decreases up to a predetermined gain designated $M_1$ in FIG. 2 and, thereafter, steadily increases as the gain of the APD is further increased. Thus, while it is generally advantageous to increase the gain such that the APD can detect optical signals having lower intensity levels, the increasing gain of the APD also increases the relative noise of the resulting electrical output signal. As described above, this increased noise can reduce the effectiveness of an optical decoder in discriminating between a logic 1 and a logic 0, thereby potentially increasing the bit error rate (BER) of the optical decoder.

A detector 50 for optical signal detection, such as an APD, can be mathematically modeled based, at least in part, on the current $I_s$ produced by incident photons and the gain M of the APD. As described above and illustrated in FIG. 2, the amplification provided by the photodetector device during the illumination of the photodetector also produces signal shot noise having a power proportional to $F(M)M^2I_s$ wherein F(M) is the excess noise factor. In the absence of light, the photodetector will not produce signal shot noise, but will continue to produce dark noise having a power proportional to $2qF(M)M^2I_{db}$ wherein $I_{db}$ is the bulk dark current produced by carriers entering the depletion layer and q is the charge of an electron, namely, $1.602 \times 10^{-19}$C. In addition, the noise portion of the signal produced by an APD includes a thermal noise component having a power proportional to $$\left(\frac{4kT}{R} + 2qI_{ds}\right)$$

wherein $I_{ds}$ is the surface dark current, k is the Boltzmann constant $(1.381 \times 10^{23}$J/molecule•K), T is the temperature and R is the resistance associated with the current-to-voltage conversion whereby the APD current is converted to a voltage.

As a result of the contributions of the various noise components, the total power of an electrical signal generated by a photodetector is the sum of the power of the signal portions and the power of the noise portion N as shown below:

$$S + N = M^2\bar{I}_s^2 + 2qF(M)M^2\bar{I}_sB + 2qF(M)M^2I_{db}B + \frac{4kTB}{R} + 2qI_{ds}B \quad (1)$$

wherein the terms from left to right represent the power of the signal portion, the signal shot noise component, the bulk dark noise component, the thermal noise component and the surface dark noise component, respectively. More particularly, B is the bandwidth of the photodetector receiver and $I_s$ is the mean signal current.

The relative contributions of the signal and noise components is shown in FIG. 1 for a Manchester encoded logic "1" as detected by an APD. Notably, the noise portion during the first phase segment is significantly larger than the noise portion during the segment phase associated with the absence of light. This difference in noise levels is attributable to the signal shot noise term in equation 1, i.e., second term of equation 1. While the operation of the weighted-sum processing method and apparatus of the present invention will be hereinafter described, for purposes of illustration, primarily in conjunction with the decoding of a Manchester encoded logic "1", it should be apparent that the weighted-sum processing method and apparatus can also detect and decode signals formatted differently as well as a Manchester encoded logic "0" in which the first phase segment is dark and the second phase segment is illuminated.

Conventional processing of the signals produced by a photodetector, such as an APD, ignores the multiplicative nature of this noise. In contrast, the digital decoding method and apparatus 10 of the present invention advantageously adjusts the relative power levels of the first and second phase segments so as to attenuate noise portion of the first phase segment, i.e., the phase segment generated by illumination of the photodetector in this example.

While the digital decoding method and apparatus 10 of the present should not be limited in scope by its theory of operation, it is believed that the theoretical underpinnings of the present invention can be explained by rewriting equation 1 in the form of a signal-to-noise ratio $$\left(\frac{S}{N} \text{ or } SNR\right)$$

as shown in equation 2 below:

$$\frac{S}{N} = \frac{M^2\bar{I}_s^2}{2qF(M)M^2\bar{I}_sB + 2qF(M)M^2I_{db}B + \frac{4kTB}{R} + 2qI_{ds}B} \quad (2)$$

The dependence of the numerator on M can then be eliminated by dividing both the numerator and the denominator by $M^2$ as shown in equation 3.

$$\frac{S}{N} = \frac{\bar{I}_s^2}{2qF(M)\bar{I}_sB + 2qF(M)I_{db}B + \frac{4kTB}{RM^2} + \frac{2qI_{ds}B}{M^2}} \quad (3)$$

The contributions of each denominator term to the total normalized noise as a function of M (the gain of the photodetector) can then be graphically illustrated as shown in FIG. 2, for example. In this example, the excess noise function is defined as F(M)=0.98(2-(1/M))+0.02M which approximates the behavior of many silicon APDs. Other values used in this example are: R=10 KΩ, $I_{db}$=2pA, $I_{ds}$=10 nA, T=300° K, B=100 MHz, $\bar{I}_s$=1000pA, and $I_{GATE}$ (GaAsFET)=2 nA which are typical values for high-quality APDs, such as the EG&G C30902S APD, and the receivers associated with such APD's. As illustrated, the signal shot noise component dominates the total noise at all but the lowest values of avalanche gain (M), i.e., at all levels of gain above about 100.

Further review of equation 2 and FIG. 2 indicates that the signal-to-noise ratio (SNR) and, therefore, the BER improves with increasing N up to the point at which the signal shot noise term (reflected by first term in denominator of equation 2) begins to dominate the noise statistics, such as above about M=100 in the illustrated example. For levels of gain above this point, the SNR of conventional optical detectors will gradually degrade with increasing levels of gain (M).

However, by analyzing the two phase segments, identifying the noisier segment and weighting at least one of the phase segments based upon the relative noise of the two phase segments, the optical decoding method and apparatus of the present invention can more reliably identify the logic level of the optically detected bit. In particular, by appropriately weighting the phase segments as described in more detail hereinbelow, the gain of the photodetector can be increased without correspondingly increasing the noise in a manner which would inhibit the decoding of an optically detected signal. Accordingly, the optical decoding method and apparatus of the present invention can advantageously detect lower level optical signals by permitting the gain of the photodetector to be increased without correspondingly increasing the contribution of the noise portion of the signal to the decoding process.

According to the digital decoding method and apparatus 10 of the present invention, the power is preferably determined for each phase segment. For example, the digital decoding apparatus can include an integrating circuit that individually computes the integral for the first phase segment and the integral for the second phase segment. For example, the integral for the first phase segment is mathematically represented below as equation 4 in which $i_t^2$ is the square of the total signal plus noise described in equation 1.

$$P_{SNI} = \int_0^{\frac{T_b}{2}} i_t^2 dt \tag{4}$$

Although the above-described integration is preferably performed by an integrating circuit, the digital decoding apparatus 10 can include other types of summation or programming alternatives and the like as are known and routinely used by those of skill in the art for integrating a signal without departing from the spirit and scope of the present invention.

After determining the power of the respective phase segments, the digital decoding method and apparatus 10 of the present invention preferably determines and applies a weighting factor to the phase segment having the greater noise power. Of course, a weighting factor could optionally be applied to the phase segment having less noise power or to both phase segments without departing from the spirit and scope of the present invention.

One advantageous method of determining a weighting factor is to assume general operating conditions in which the noise power due to signal shot noise can be expressed as (m) times all remaining sources of noise power during the illuminated portion of the optical signal as shown in equation 5 below:

$$I_{NS}^2 = M I_{NT}^2 \tag{5}$$

In this equation, $I_{NS}^2$ is the signal shot noise power (also shown as the first term in the denominator of equation 2) and $I_{NT}^2$ is the remaining noise power (second, third and fourth terms of the denominator of equation 2).

For a 50% duty-cycle signal, such as a Manchester encoded signal, the modulated signal illuminates the detector for only half of the bit period. As a result, the SNR of equation 3 can be rewritten in simplified form as:

$$\frac{S}{N} = \frac{\left(\frac{1}{2}I_s\right)^2}{\frac{1}{2}N_s + N_t} \tag{6}$$

wherein $N_s$ is the square of the signal shot noise current, $N_t$ is the square of the remaining noise currents, $I_s$ is the peak signal current (as opposed to the average or mean signal current $\bar{I}s$ of equations 1–3).

According to the digital decoding method and apparatus 10 of the present invention, the phase segment corresponding to the light portion of an optical signal, for example, is noisier and will generally be weighted by a weighting factor (x) which preferably has a value $0 \leq x \leq 1$. Thus, equation 3 can be rewritten as shown in equation 7.

$$\frac{S}{N} = \frac{\frac{I_s}{2}\left(\frac{1}{2}+\frac{x}{2}\right)}{\sqrt{\left(\frac{x}{2}I_{NS}\right)^2+\left(\frac{x}{2}I_{NT}\right)^2+\left(\frac{1}{2}I_{NT}\right)^2}} = \frac{\frac{I_s}{2}\left(\frac{x+1}{2}\right)}{\sqrt{\frac{x^2}{4}mI_{NT}^2+\frac{x^2}{4}I_{NT}^2+\frac{1}{4}I_{NT}^2}} \tag{7}$$

wherein $$\frac{S}{N}$$

is herein expressed as a ratio of the signal voltage to the noise voltage, while equations 3 and 7 are expressed as a ratio of the signal power to the noise power.

According to conventional digital decoding schemes in which neither phase segment is attenuated, the weighting factor x is effectively set to 1 regardless of the value of (m). By attenuating at least one of the phase segments, typically the noisier phase segment, the digital decoding method and apparatus of the present invention improves the SNR. This improvement is demonstrated by equation 8 below in which a ratio designated f(x) is computed of $$\frac{S}{N}(x) \text{ to } \frac{S}{N}(x=1):$$

$$f(x) = \frac{(x+1)}{\sqrt{x^2m+x^2+1}} \frac{\sqrt{m+2}}{2} \tag{8}$$

Equation 8 can be maximized by differentiating the equation and setting the result equal to 0 as expressed by equation 9.

$$\frac{df(x)}{dx} = \sqrt{m+2}\sqrt{x^2(m+1)+1}\left(\frac{1}{2}\right) - \frac{\frac{x+1}{2}\left(\frac{1}{2}\right)[x^2(m+1)+1]^{-1/2}(m+1)2x}{x^2(m+1)+1} = 0 \tag{9}$$

Thus, an optimum value for x which would result in an optimum improvement ($X_{opt}$) of the SNR can be determined by solving equation 9 to yield equation 10.

$$x_{opt} = \frac{1}{m+1} \tag{10}$$

Although the preferred weighting factor is $X_{opt}$ in order to optimize the improvements in the SNR, the digital decoding method and apparatus 10 of the present invention can employ other weighting factors x without departing from the spirit and scope of the present invention. For example, a weighting factor could be selected from one of several predetermined weighing factors stored by a reference program or signal processing circuitry. The actual attenuation value or weighing factor could then be selected from among these predetermined weighting factors based upon the relative power of the noise portions of each respective phase segment. Preferably, however, an optimum weighting factor $X_{opt}$ is computed based upon a ratio of the signal shot noise to the remaining sources of noise as described above. Thereafter, the phase segment having the greatest noise, such as the first phase segment in FIG. 1, is attenuated by the weighting factor, such as by multiplying both the signal and noise portions of the respective phase segment by the weighting factor, while the other phase segment is unchanged.

In one example in which $I_{NS}^2 = I_{NT}^2$ such that m=1, the optimum weighting factor $X_{opt}$ will be ½. As a result, the resulting S/N improvement may be relatively small, such as 0.5 dB. However, the digital decoding method and apparatus of the present invention overcomes the quantum limit restraints typically imposed by conventional signal processing which lead to the degradation of the SNR with increasing APD gains as illustrated in FIG. 2. For example, for an APD having a gain (M) of about 500, the ratio of $I_{NS}^2 = I_{NT}^2$ and, therefore, the value of m, is approximately 200. Accordingly, the weighting factor, $x_{opt}$, is 1/201. By weighting the noisier phase segment of the signal by $x_{opt}$ in this example, the SNR will improve by a factor of about 7, which translates into an 17 dB improvement. It is noted that in most practical situations such a large ratio of signal shot noise to other sources of noise (m=200) will rarely be achieved such that the exemplary 17 dB improvement will typically be on the upper end of the performance of the digital decoding method and apparatus of the present invention.

Notably, in instances in which the signal shot noise is dominant, the value (m) increases approximately in proportion to $M^2$. As supported by equation 7, however, as m>>1, the improvement in S/N asymptotically approaches the expression $½(m+2)^{1/2}$. Of course, a natural limit exists on the APD gain (M) beyond which breakdown occurs. In addition, as M becomes very large, the multiplied bulk dark current (the second term in the denominator of equation 2) will begin to dominate. Thus, by increasing the gain M beyond the point at which the multiplied bulk dark current begins to dominate the noise statistics, the SNR will again begin to degrade. Further, since the multiplied bulk dark current exists at all times, i.e., since the bulk dark current is not signal dependent, there currently is no known way to remove its effect using non-linear processing methods. Thus, the gain of the photodetector is preferably maintained at levels below which the bulk dark current dominates.

Figure 3:
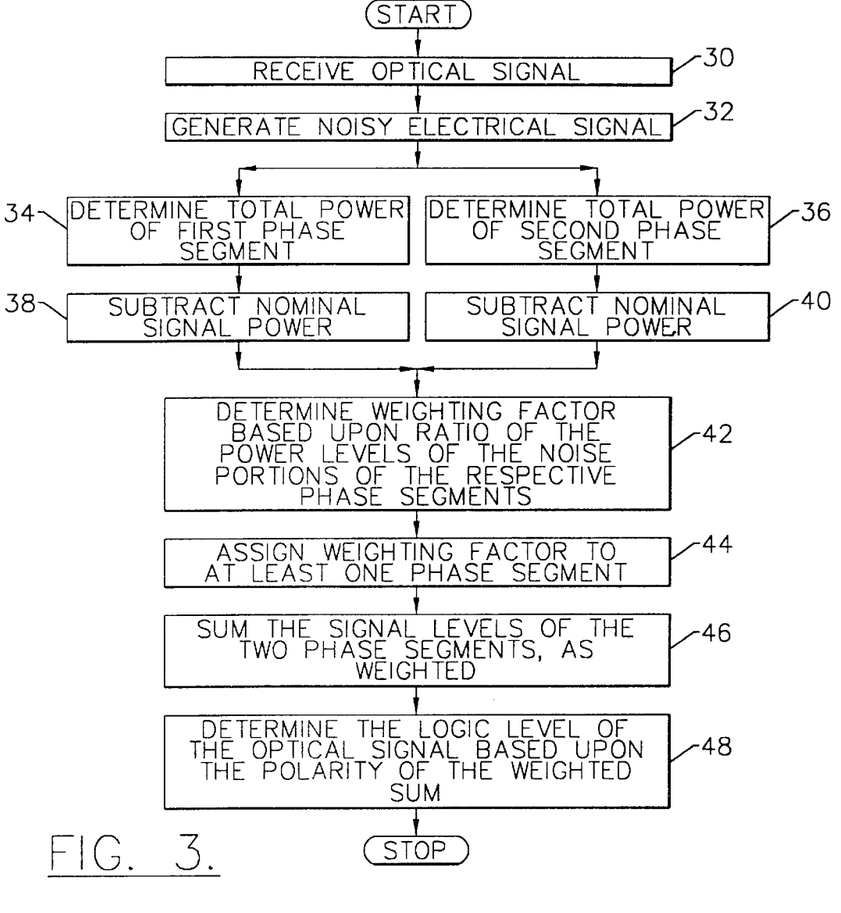
FIG. 3 is a block diagram illustrating the operations performed by the weighted-sum decoding method and apparatus of one embodiment of the present invention.
Figure 4:
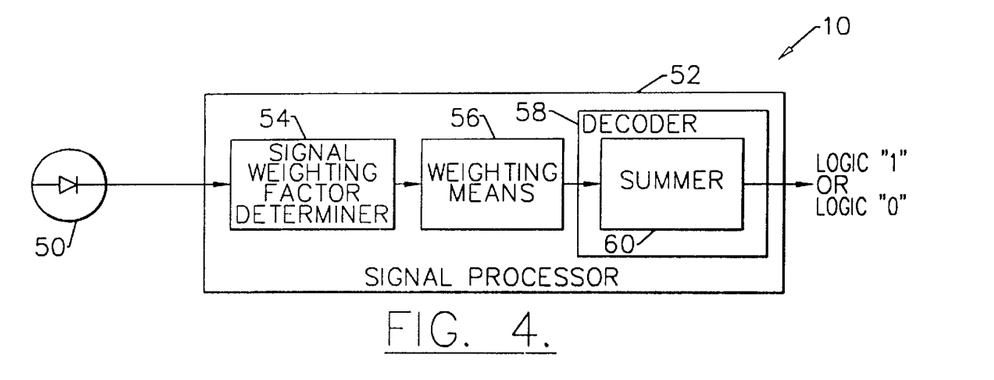
FIG. 4 is a hardware block diagram of a weighted-sum decoding apparatus of one embodiment of the present invention.

Referring now to FIG. 4, in which a digital receiver 10 according to one advantageous embodiment of the present invention is illustrated, and FIG. 3 in which the operations performed by the digital receiver of FIG. 4 are illustrated, the digital receiver includes, according to one advantageous embodiment of the present invention, a detector 50, such as an APD, for detecting an optical signal having a light portion and a dark portion and for generating an electrical signal in response thereto as shown in blocks 30 and 32 of FIG. 3. As described above, the electrical signal generated by the photodetector preferably has a first phase segment generated during the illumination of the photodetector and a second phase segment generated by the photodetector in the absence of light. As also described above, each phase segment includes respective signal and noise portions as shown in FIG. 1 and schematically in FIG. 4.

The digital receiver 10 also includes a signal processor 52 for decoding the electrical signal generated by the detector so as to identify the digital signal detected thereby. The signal processor includes signal weighting factor determining means 54 for determining a signal weighting factor based upon the respective noise portions of the two phase segments. In particular, the signal weighting factor determining means preferably determines the power of the first phase segment and the power of the second phase segment as shown in blocks 34 and 36 of FIG. 3. In this manner, the signal weighting factor determining means can also determine the phase segment which has the greatest noise.

More particularly, the signal weighting factor determining means 54 preferably separates the signal portion of each phase segment from the noise portion such that the power levels of the respective noise portions can be individually analyzed. In order to separate the respective signal portions, the signal weighting factor determining means preferably maintains or determines a nominal power level for the signal portions which can be subtracted from each phase segment in order to isolate the respective noise portions as shown in blocks 38 and 40. The nominal power level can be determined in several fashions. For example, the nominal power level of the signal portions can be pre-selected based upon the anticipated power levels of the electrical signals to be generated by the APD. Alternatively, the signal weighting factor determining means can determine the nominal power level of the respective signal portions by maintaining a running root mean square (RMS) average of the power level of the respective signal portions of prior electrical signals.

Once the respective noise portions of the phase segments have been isolated, the signal weighting factor determining means 54 can determine the ratio of the signal shot noise power in the noisier phase segment to the noise components of the quieter phase segment by taking the ratio of the power level of the noisier phase segment to the power level of the quieter phase segment in order to determine m. Based upon the value m determined by the signal weighting factor determining means, the signal weighting factor determining means can determine the weighting factor x and, preferably, the optimum weighting factor $x_{opt}$ as described above and as shown in block 42 of FIG. 3.

The signal processor 52 also includes a weighting means 56 for weighting at least one of the phase segments by the signal weighting factor as shown in block 44. Preferably, the weighting means weights the noisier phase segment, including both the signal portion and the noise portion of the noisier phase segment, by the weighting factor, such as by multiplying the power level of the appropriate phase segment by the weighting factor. While the weighting means preferably weights the noisier phase segment, the digital decoding method and apparatus of the present invention can weight the quieter phase segment or both phase segments if so desired without departing from the spirit and scope of the present invention.

The signal processor 52 also preferably includes a decoder 58 for identifying the digital signal based upon the first and second phase segments, as weighted by the weighting factor. Preferably, the decoder includes a summer 60 for summing the signal levels of the two phase segments, as weighted by the weighting means, to produce a weighted sum having a respective polarity. Thus, the decoder can identify the digital signal based upon the polarity of the weighted sum as shown in blocks 46 and 48 of FIG. 3.

Although the signal processor 52 can be implemented in a variety of manners without departing from the spirit and scope of the present invention, the signal processor of one embodiment of the present invention, including the signal weighting factor determining means 54, the weighting means 56 and the decoder 58, including the summer 60, are preferably implemented by a combination of hardware and software. For example, the signal processor can be implemented by a computer having one or more controllers and related memory elements which operate under the control of software to provide the requisite data calculations and decoding logic.

By weighting at least one of the phase segments based upon the power of the noise portions of the respective phase segments, the decoding method and apparatus 10 of the present invention can reliably detect and decode digital signals. In particular, the decoding method and apparatus of the present invention can reliably decode digital signals even as the gain provided by the detector 50, such as the gain provided by an APD, is increased, thereby allowing digitally modulated signals having lower power levels to be reliably detected and decoded.

The foregoing is illustrative of the present invention and is not to be construed as limiting thereof. The invention is defined by the following claims, with equivalents of the claims to be included therein.

That which is claimed is:

1. A method of decoding a digital signal comprising the steps of:

detecting a digitally encoded communications carrier signal having first and second portions;

generating a signal having two phase segments in response to the detected digitally encoded communications carrier signal, wherein one phase segment corresponds to the first portion of the digitally encoded communications carrier signal and the other phase segment corresponds to the second portion of the digitally encoded communications carrier signal, and wherein each phase segment includes respective signal and noise portions;

determining a signal weighting factor based upon the respective noise portions of the two phase segments;

weighting at least one phase segment by the signal weighting factor; and decoding the digital signal based upon the two phase segments as weighted by the signal weighting factor.

2. A method according to claim 1 wherein said determining step comprises the steps of:

determining a ratio of the power of the noise portion of one phase segment to the power of the noise portion of the other phase segment; and determining the signal weighting factor based upon the ratio of the power of the respective noise portions of the two phase segments.

3. A method according to claim 1 wherein said determining step comprises the steps of:

determining the power of the noise portion of each respective phase segment; and determining the signal weighting factor such that the multiplicative product of the signal weighting factor and the power of the noise portion of one phase segment equals the power of the noise portion of the other phase segment.

4. A method according to claim 3 wherein the noise portion of the phase segment corresponding to the first portion of the digitally encoded communications carrier signal includes a multiplicative noise component, wherein the noise portion of the phase segment corresponding to the second portion of the digitally encoded communications carrier signal includes a low level noise component, and wherein said signal weighting factor determining step comprises determining the signal weighting factor such that the multiplicative product of the signal weighting factor and the power generated by the multiplicative noise component equals the power generated by the low level noise component.

5. A method according to claim 3 wherein the signal weighting factor is no less than 0 and no greater than 1, and wherein said weighting step comprises weighting the phase segment which has the noise portion with the greatest power.

6. A method according to claim 1 wherein said generating step comprises amplifying the signal generated in response to the detected digitally encoded communications carrier signal.

7. A method according to claim 1 wherein said decoding step comprises the steps of:

summing the two phase segments as weighted by the signal weighting factor to produce a weighted sum having a respective polarity; and identifying the digital signal based upon the polarity of the weighted sum.

8. A method of decoding digital signals comprising the steps of:

detecting a digitally encoded communications carrier signal having first and second portions;

generating a signal having two phase segments in response to the detected digitally encoded communications carrier signal, wherein one phase segment corresponds to the first portion of the digitally encoded communications carrier signal and the other phase segment corresponds to the second portion of the digitally encoded communications carrier signal, and wherein each phase segment includes respective signal and noise portions;

determining a signal weighting factor of less than 1 based upon the respective noise portions of the two phase segments;

weighting the phase segment which has the noise portion with the greatest power by the signal weighting factor; and decoding the digital signal based upon the two phase segments as weighted by the signal weighting factor.

9. A method according to claim 8 wherein said determining step comprises the steps of:

determining a ratio of the power of the noise portion of one phase segment to the power of the noise portion of the other phase segment; and determining the signal weighting factor based upon the ratio of the power of the respective noise portions of the two phase segments.

10. A method according to claim 8 wherein said determining step comprises the steps of:

determining the power of the noise portion of each respective phase segment; and determining the signal weighting factor such that the multiplicative product of the signal weighting factor and the power of the noise portion of one phase segment equals the power of the noise portion of the other phase segment.

11. A method according to claim 10 wherein the noise portion of the phase segment corresponding to the first portion of the digitally encoded communications carrier signal includes a multiplicative noise component, wherein the noise portion of the phase segment corresponding to the second portion of the digitally encoded communications carrier signal includes a low level noise component, and wherein said signal weighting factor determining step comprises determining the signal weighting factor such that the multiplicative product of the signal weighting factor and the power generated by the multiplicative noise component equals the power generated by the low level noise component.

12. A method according to claim 8 wherein said generating step comprises amplifying the signal generated in response to the detected digitally encoded communications carrier signal.

13. A method according to claim 8 wherein said decoding step comprises the steps of:

summing the two phase segments as weighted by the signal weighting factor to produce a weighted sum having a respective polarity; and identifying the digital signal based upon the polarity of the weighted sum.

14. A receiver for detecting and decoding a digitally encoded communications carrier signal, said receiver comprising:

a detector for generating an electrical signal in response to a digitally encoded communications carrier signal, wherein the electrical signal has two phase segments corresponding to first and second portions, respectively, of the digitally encoded communications carrier signal, and wherein each phase segment includes respective signal and noise portions;

signal weighting factor determining means, responsive to said detector, for determining a signal weighting factor based upon the respective noise portions of the two phase segments;

weighting means, responsive to said signal weighting factor determining means, for weighting the phase segment corresponding to the first portion of the digitally encoded communications carrier signal by the signal weighting factor; and a decoder, responsive to said weighting means, for identifying the digital signal based upon the two phase segments as weighted by signal weighing factor.

15. A receiver according to claim 14 wherein said detector includes at least one RF detector.

16. A receiver according to claim 14 wherein said detector includes at least one infrared detector.

17. A receiver according to claim 14 wherein said detector includes at least one magnetic detector.

18. A receiver according to claim 14 wherein said signal weighting factor determining means comprises power determining means for determining the power of the respective noise portions of the two phase segments.

19. A receiver according to claim 18 wherein said signal weighting factor determining means determines the signal weighting factor based upon a ratio of the power of the respective noise portions of the two phase segments.

20. A receiver according to claim 18 wherein said signal weighting factor determining means determines the signal weighting factor such that the multiplicative product of the signal weighting factor and the power of the noise portion of the phase segment corresponding to the first portion of the digitally encoded communications carrier signal equals the power of the noise portion of the phase segment corresponding to the second portion of the digitally encoded communications carrier signal.

21. A receiver according to claim 14 wherein said decoder comprises a summer for summing the phase segment corresponding to the first portion of the digitally encoded communications carrier signal, as weighted by said weighting means, and the phase segment corresponding to the second portion of the digitally encoded communications carrier signal to produce a weighted sum having a respective polarity such that said decoder can identify the digital signal based upon the polarity of the weighted sum.

* * * * *

UNITED STATES PATENT AND TRADEMARK OFFICE
CERTIFICATE OF CORRECTION

PATENT NO. : 6,128,112
DATED : October 3, 2000
INVENTOR(S) : Harres

It is certified that error appears in the above-identified patent and that said Letters Patent is hereby corrected as shown below:

Column 8, Equation 9:

" $$\frac{df(x)}{dx} = \sqrt{m+2} \sqrt{x^2(m+1)+1} \left(\frac{1}{2}\right) - \frac{\frac{x+1}{2}\left(\frac{1}{2}\right)[x^2(m+1)+1]^{-1/2}(m+1)2x}{x^2(m+1)+1} = 0 \quad (9)$$ "

should read

-- $$\frac{df(x)}{dx} = \sqrt{m+2} \, \frac{\sqrt{x^2(m+1)+1}\,(\frac{1}{2}) - \frac{x+1}{2}(\frac{1}{2})[x^2(m+1)+1]^{-1/2}(m+1)2x}{x^2(m+1)+1} = 0 \quad (9)$$ --.

Signed and Sealed this

Eighth Day of May, 2001

*Attest:*

NICHOLAS P. GODICI

*Attesting Officer*     *Acting Director of the United States Patent and Trademark Office*